United States Patent
Shigemura et al.

(10) Patent No.: US 7,480,820 B2
(45) Date of Patent: Jan. 20, 2009

(54) DISK ARRAY APPARATUS, METHOD FOR CONTROLLING THE SAME, AND PROGRAM

(75) Inventors: Takeshi Shigemura, Odawara (JP); Seiki Morita, Odawara (JP); Atsushi Ishikawa, Minami ashigara (JP); Yoshihiro Uchiyama, Odawara (JP)

(73) Assignee: Hitachi, Ltd., Tokyo (JP)

( * ) Notice: Subject to any disclaimer, the term of this patent is extended or adjusted under 35 U.S.C. 154(b) by 540 days.

(21) Appl. No.: 11/261,772

(22) Filed: Oct. 31, 2005

(65) Prior Publication Data

US 2007/0050670 A1 Mar. 1, 2007

(51) Int. Cl.
G06F 11/00 (2006.01)
(52) U.S. Cl. ......................................................... 714/7
(58) Field of Classification Search ................... 714/7, 714/8
See application file for complete search history.

(56) References Cited

U.S. PATENT DOCUMENTS

| | | | | | |
|---|---|---|---|---|---|
| 5,812,761 | A | * | 9/1998 | Seki et al. | 714/54 |
| 5,889,939 | A | * | 3/1999 | Iida | 714/47 |
| 6,029,254 | A | * | 2/2000 | Andrews | 714/6 |
| 6,308,265 | B1 | * | 10/2001 | Miller | 713/2 |
| 6,546,502 | B1 | * | 4/2003 | Ishi | 714/7 |
| 7,085,965 | B2 | * | 8/2006 | Arakawa et al. | 714/42 |
| 7,143,309 | B2 | * | 11/2006 | Yoshida | 714/8 |
| 7,149,861 | B2 | * | 12/2006 | Ogasawara et al. | 711/162 |
| 7,328,392 | B2 | * | 2/2008 | Chikusa et al. | 714/770 |
| 2004/0128581 | A1 | * | 7/2004 | Yoshida | 714/5 |
| 2005/0015655 | A1 | * | 1/2005 | Clayton et al. | 714/6 |
| 2005/0149669 | A1 | | 7/2005 | Suzuki et al. | |
| 2006/0059408 | A1 | * | 3/2006 | Chikusa et al. | 714/770 |
| 2006/0245103 | A1 | * | 11/2006 | Ueno et al. | 360/53 |

FOREIGN PATENT DOCUMENTS

JP 2004-348876 5/2003

* cited by examiner

*Primary Examiner*—Robert Beausoliel
*Assistant Examiner*—Amine Riad
(74) *Attorney, Agent, or Firm*—Reed Smith LLP; Stanley P. Fisher, Esq.; Juan Carlos A. Marquez, Esq.

(57) ABSTRACT

The present invention proposes a disk array apparatus that can be inexpensively constructed while maintaining its high reliability, and also proposes a method for controlling the disk array apparatus, and a program. In the disk array apparatus, a storage area in a storage device for storing system information is managed by dividing the storage area into a system area for storing system information and a data area for storing data from a host device, and verification processing is executed on the data area in the storage device in a first cycle and on the system area in a second cycle that is shorter than the first cycle.

18 Claims, 10 Drawing Sheets

DISK ARRAY APPARATUS, METHOD FOR CONTROLLING THE SAME, AND PROGRAM

CROSS-REFERENCE TO RELATED APPLICATION

This application relates to and claims priority from Japanese Patent Application No. 2005-248221, filed on Aug. 29, 2005, the entire disclosure of which is incorporated herein by reference.

BACKGROUND OF THE INVENTION

The present invention relates to a disk array apparatus, a method for controlling the disk array apparatus, and a program, and is preferably applied to a disk array apparatus using a disk with low reliability as a system disk.

In recent years, a so-called disk array apparatus in which a plurality of hard disk devices is managed and operated using a RAID (Redundant Array of Inexpensive Disks) system has been widely used as a storage apparatus for data storage in corporations and government offices.

With the recent fall in price of disk array apparatuses, the use of a SATA (Serial AT Attachment) disk, which is less expensive than a conventionally used Fibre Channel disk, has been proposed. (See JP-A-2004-348876).

SUMMARY OF THE INVENTION

However, while a SATA disk is inexpensive, it has low reliability. Therefore, if a SATA disk is used simply instead of a Fibre Channel disk as a hard disk drive for storing information, that requires maintained reliability—for example, information called system information that is necessary for operating the disk array apparatus—this may cause the problem of deteriorated reliability for the entire disk array apparatus.

The present invention is made in consideration of the above problem. It is an object of this invention to provide a disk array apparatus that can be constructed inexpensively while maintaining high reliability, and also propose a method for controlling such a disk array apparatus, and a program.

To solve the above described problem, the present invention provides a disk array apparatus that operates based on predetermined system information, and the disk array apparatus includes: a storage device for storing the system information; and a management unit for managing a storage area in the storage device by dividing the storage area into a system area for storing system information and a data area for storing data from a host system, wherein the management unit executes verification processing for the data area in the storage device in a first cycle, and executes the verification processing to the system area in a second cycle that is shorter than the first cycle.

As a result, in this disk array apparatus, the reliability of the system information stored in the system area in the storage device can be enhanced.

The present invention also provides a method for controlling a disk array apparatus that operates based on predetermined system information, and the disk array apparatus control method includes: a first step of managing a storage area in a storage device for storing the system information by dividing the storage area into a system area for storing system information and a data area for storing data from a host system; and a second step of executing verification processing on the data area in the storage device in a first cycle, and executing the verification processing on the system area in a second cycle that is shorter than the first cycle.

As a result, with this disk array apparatus control method, the reliability of the system information stored in the system area in the storage device can be enhanced.

Moreover, the present invention provides a program for making a computer that controls the operation of a disk array apparatus that operating based on predetermined system information, execute processing including: a first step of managing a storage area in a storage device for storing system information by dividing the storage area into a system area for storing the system information and a data area for storing data from a host system; and a second step of executing verification processing on the data area in the storage device in a first cycle, and executing the verification processing on the system area in a second cycle that is shorter than the first cycle.

As a result, using this program, the reliability of the system information stored in the system area in the storage device can be enhanced.

According to the present invention, even when an inexpensive storage device such as a SATA disk is used as a storage device for storing system information, highly reliable system information is possible. Accordingly, it is possible to construct a disk array apparatus inexpensively, while maintaining high reliability.

DETAILED DESCRIPTION OF THE INVENTION

One embodiment of the present invention will be hereinafter described in detail with reference to the attached drawings.

(1-1) Configuration of Network System According to the Present Embodiment

Figure 1:
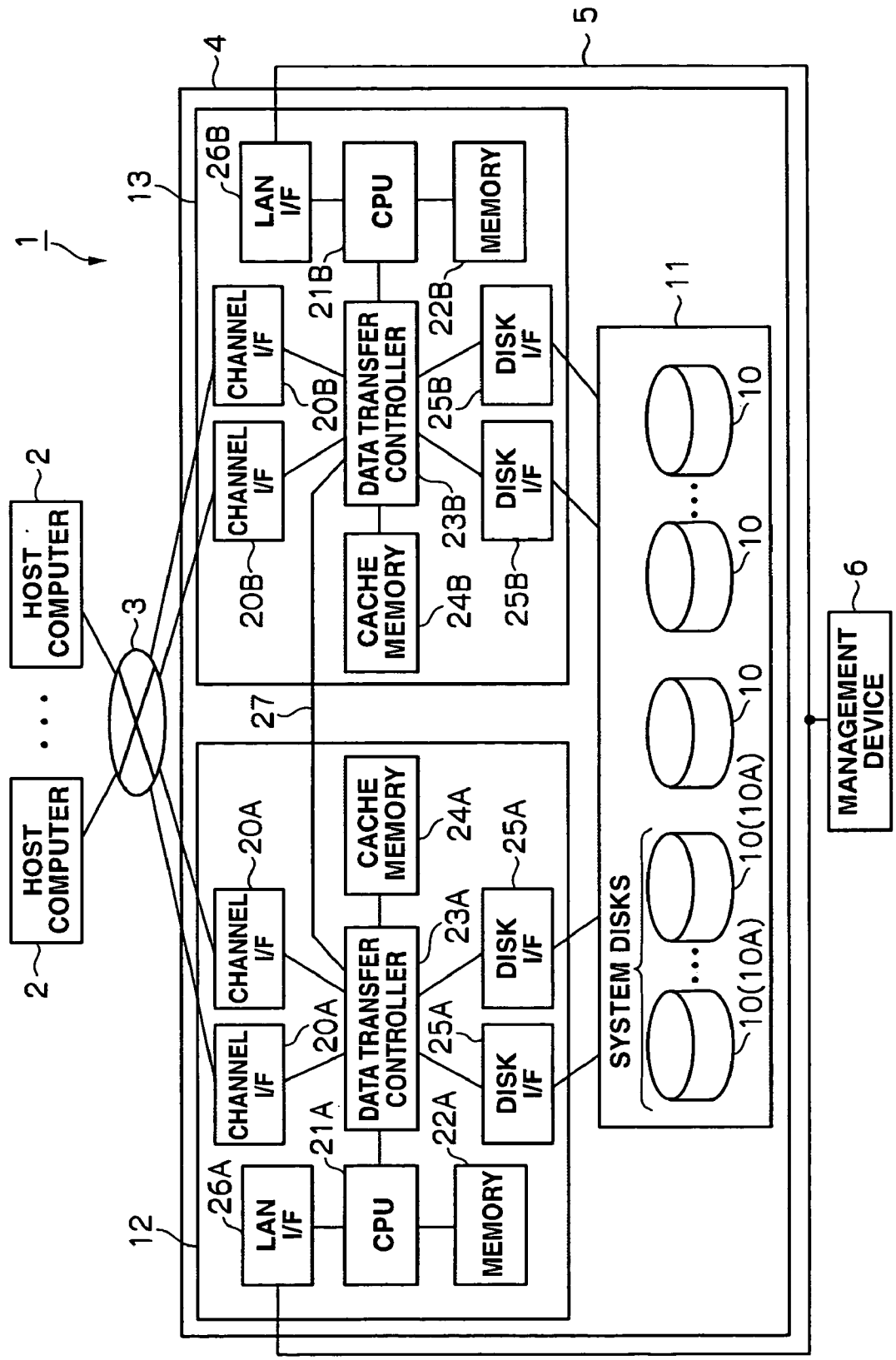
FIG. 1 is a block diagram showing the configuration of a network system according to an embodiment of this invention.

FIG. 1 shows a network system 1 according to the present embodiment. In the network system 1, host computers 2 are connected via a network 3 to a disk array apparatus 4, and the disk array apparatus 4 is connected via a LAN 5 to a management device 6.

Each of the host computers 2 is a computer device having information processing resources, such as a CPU (Central Processing Unit) and memory. The host computer 2 is, for example a personal computer, a work station, or a main frame. The host computer 2 includes: an information input device (not shown) such as a keyboard, a switch, a pointing device, or a microphone; and an information output device (not shown) such as a monitor display and a speaker.

Examples of the network 3 include a SAN (Storage Area Network), a LAN (Local Area Network), the internet, a public line, and a dedicated line. The host computer 2 and the disk array apparatus 4 communicate with each other via the network 3 in accordance with Fibre Channel Protocol if the network 3 is a SAN, or with TCP/IP (Transmission Control Protocol/Internet Protocol) if the network 3 is the LAN.

The disk array apparatus 4 includes a disk device group 11 formed by a plurality of disk devices 10 such as hard disk drives, and dual controllers 12 and 13 for controlling each of the disk devices 10 forming the disk device group 11.

Each of the disk devices 10 is an expensive hard disk such as a Fibre Channel disk, or an inexpensive hard disk such as a SATA (Serial AT Attachment) disk. In the disk array apparatus 4 according to the present embodiment, at least a plurality (for example, five) of disk devices 10 used as system disks are SATA disks. Both controllers 12 and 13 can access each disk device 10. With this configuration, even when a malfunction occurs in one controller 12 or 13, the other controller 13 or 12 can read or write data from or to the respective disk devices 10.

The controller 12 includes: a plurality of channel interfaces 20A; a CPU 21A; local memory 22A; a data transfer controller 23A; cache memory 24A; a plurality of disk interfaces 25A; and a LAN interface 26A.

Each of the channel interfaces 20A is an interface for the network 3, which transmits and receives write data, data read from the disk devices 10, and various commands to or from the host computer 2.

The CPU 21A is a processor for controlling data input/output processing (write access or read access) to the disk devices 10 in response to data input or output requests from the host computer 2, and controls each of the channel interfaces 20A, the data transfer controller 23A, and each of the disk interfaces 25A by executing a microprogram read from the disk device 10. The local memory 22A is used as a work memory for the CPU 21A.

The data transfer controller 23A controls data transfer between the channel interfaces 21A and the disk interfaces 25A under the control of the CPU 21A. The data transfer controller 23A is connected via a bus 27 to a data transfer controller 23B in the other controller 13 described later in order to enable communication between them, and thereby those two controllers 12 and 13 can mutually exchange commands and data.

The cache memory 24A is used for temporarily storing the data transferred between the channel interfaces 20A and the disk interfaces 25A. This cache memory 24A also stores the system information read from the system disk 10A at start-up of the disk array apparatus 4.

The disk interface 25A is an interface for the disk devices 10 that transmits and receives write data, data read from the disk devices 10, and various commands to/from the disk devices 10 in accordance with, for example, Fibre Channel Protocol. The LAN interface 26A is an interface for the LAN 5 that, for example, transmits and receives data and various control commands to/from the management device 6 in accordance with, for example, TCP/IP.

Just like the above-described controller 12, the other controller 13 includes: a plurality of channel interfaces 20B; a CPU 21B; local memory 22B; a data transfer controller 23B; cache memory 24B; a plurality of disk interfaces 25B; and a LAN interface 26B.

The channel interfaces 20B, the CPU 21B, the local memory 22B, the data transfer controller 23B, the cache memory 24B, the disk interfaces 25B, and the LAN interface 26B have respectively the same functions as those of the channel interfaces 20A, the CPU 21A, the local memory 22A, the data transfer controller 23A, the cache memory 24A, the disk interfaces 25A, and the LAN interface 26A in the above-described controller 12. Therefore, even if a malfunction occurs in one controller 12 or 13, the other controller 13 or 12 can continue operations.

The management device 6 is a computer device having hardware resources such as a CPU, memory, and a display, and exchanges various data and commands via the LAN 5 with the CPUs 21A and 21B in the controllers 12 and 13. The management device 6 monitors the operation status of the disk array apparatus 4 and the occurrence of any malfunctions in the same, displays relevant information on a display, and controls the operation of the disk array apparatus 4 guided by an operator. Using the management device 6, a user can define system configuration information, change the information if needed, and store the thus defined system configuration information, via the CPUs 21A and 21B in the controllers 12 and 13, in the cache memories 24A and 24B.

Figure 2:
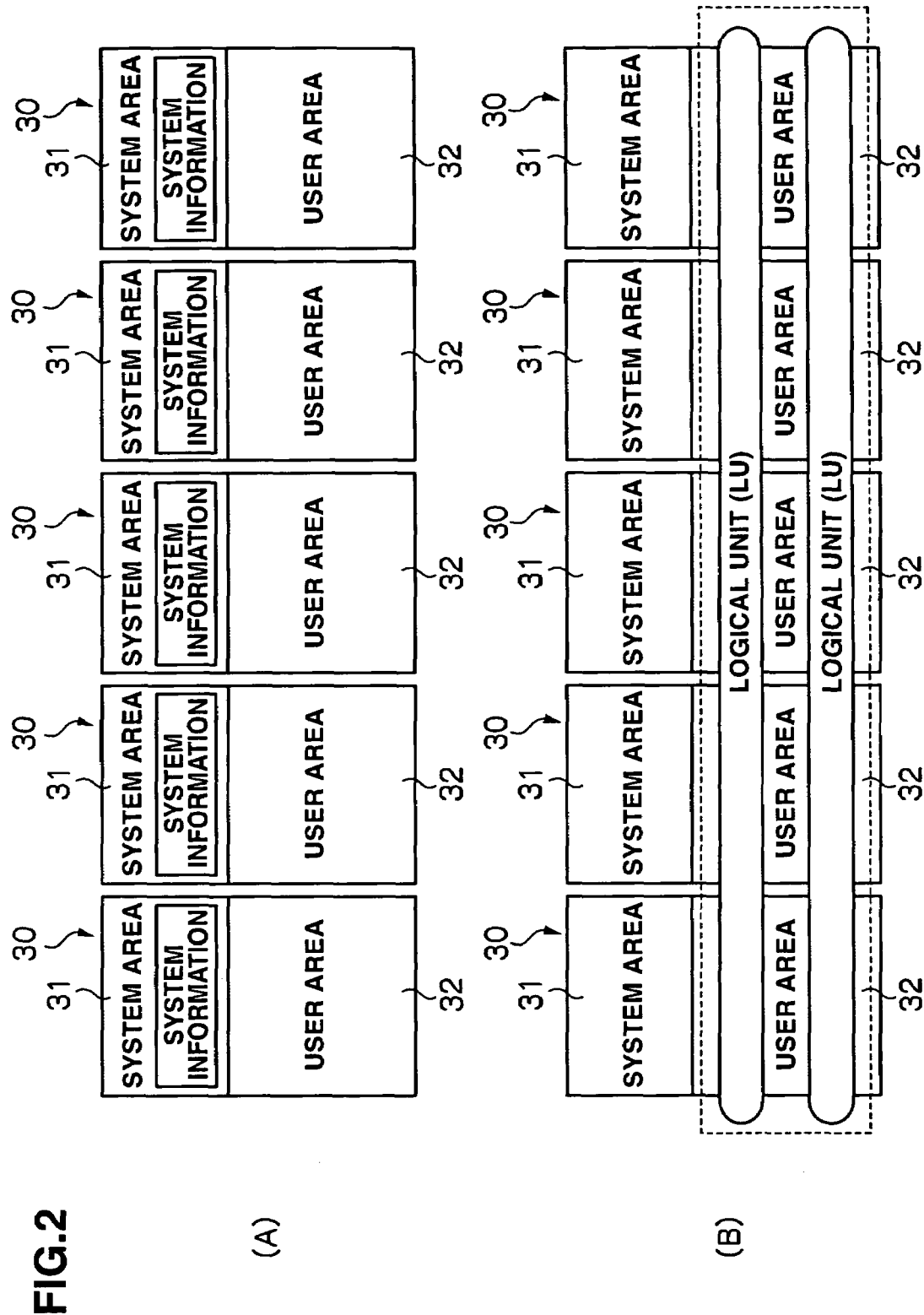
FIGS. 2(A) and (B) are conceptual diagrams showing logical configurations of a disk device.

FIG. 2(A) shows the logical configuration of a storage area in each disk device 10 in the disk array apparatus 4. In this disk array device 4, a physical storage area 30 provided by each disk device 10 is managed by dividing the physical storage area 30 into two areas: a system area 31 and a user area 32.

In the respective system areas 31 in a plurality of (for example, five) disk devices 10 used as the system disks 10A, the system information about the disk array apparatus 4 is mirrored and stored. Accordingly, even when a malfunction occurs in one of the system disks 10A, the disk array apparatus 4 can be controlled based on the system information stored in the other system disks 10A. Nothing is stored in the system areas of the disk devices 10 other than the system disks 10A.

As shown in FIG. 2(B), the user area 32 of each disk device 10 is managed and operated by the controllers 12 and 13 according to the RAID system. One RAID group is formed by a plurality of disk devices 10, and one or a plurality of logical units LU is set on the user areas 32 of the disk devices 10 forming the RAID group. Data from the host computer 2 is stored in the logical unit LU, in which a block having a predetermined size (hereinafter referred to as a "logical block") is a unit.

Each logical unit LU is provided with a specific identification number (hereinafter referred to as "LUN: Logical Unit Number"). A combination of the LUN and the number (hereinafter referred to as "LBA: Logical Block Address") that is provided to and specific to each logical block is regarded as an address, and data input and output are done by specifying the address.

The system information elements include, for example: microprograms (computer programs) read and executed by the CPUs 21A and 21B; configuration information about the configuration of the disk array apparatus 4; and trace information used for analysis when a malfunction occurs in the disk array apparatus 4.

The configuration information includes: hard disk information about how many disk devices 10 are mounted in which slots; RAID group information about which disk devices 10 constitute RAID groups of which RAID level (e.g. 0, 1, 5);

various logical unit information about the logical units LU; and function information about which optional functions are available.

The trace information includes: malfunction information about what kind of malfunction has occurred at which location in the disk array apparatus 4; received command information about what the command received from the management device was; automatic processing content information about what the processing automatically executed by the disk array apparatus 4 was, such as on-line verification described later; and received access request information about what kind of access request was received from which of the host computers 2. Various information elements included in the trace information are stored in relation to time information about the time when the event indicated by the information elements has occurred.

The system information is read from the system disks 10A at start-up, and written to and retained in the cache memories 24A and 24b in the controllers 12 and 13. In this system information, the configuration information is updated by the CPUs 21A and 21B in accordance with an update command to update the information given by the user. Also, the trace information is added to by the CPUs 21A and 21B every time a predetermined event occurs.

When the system information changes because the configuration information is updated and trace information is added, the CPUs 21A and 21B overwrite the latest system information after the change and update the system information stored in the system area 31 in each system disk 10A.

(1-2) Processing of Reading or Writing System Information from or to a System Area In this disk array apparatus 4, because the SATA disk is employed as the system disk 10A as described above, reliability of the system disk 10A is low, and so-called the problem of backlight, namely, data being written to a position away from the correct head position, and other malfunctions are likely to occur.

Figure 3:
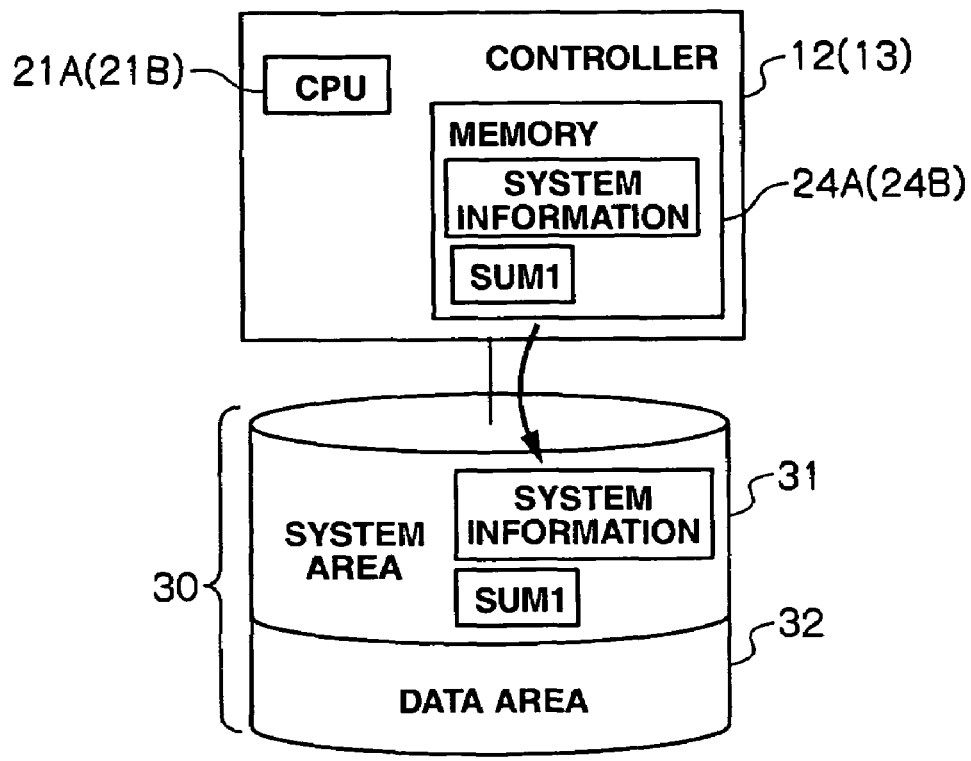
FIG. 3 is a conceptual diagram illustrating processing for reading or writing system information from or to a system area in a disk device.

Therefore, when the system information is written to the system area 31 in the system disk 10A, for example, when the system information stored in the system disk 10A is updated in response to the above mentioned system information change to the cache memories 24A and 24B and when the system information in the cache memories 24A and 24B is saved to the system disk 10A during shutdown processing for the disk array apparatus 4, a sum value of the check sum for verifying the consistency of the system information is stored together with this system information in the system area 31 in each system disk 10A as shown in FIG. 3.

Figure 4:
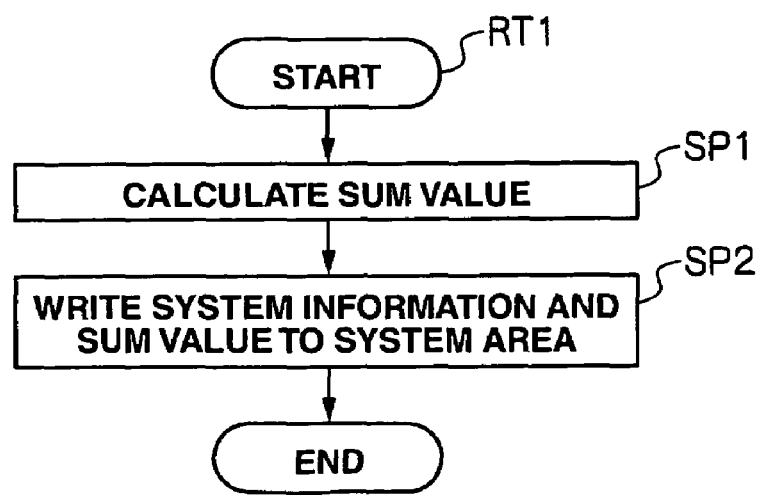
FIG. 4 is a flow chart showing a system information write processing sequence.

In practice, when the system information is stored in the system area 31 in each system disk 10, the CPUs 21A and 21B in the disk array apparatus 4 generate (calculate) the sum value for the latest system information in accordance with the system information write processing procedure RT1 shown in FIG. 4 (SP1), and write the thus obtained sum value together with the latest system information in the system area 31 in each system disk 10 (SP2).

When reading the system information from the system disk 10, for example, at start-up of the disk array apparatus 4, the CPUs 21A and 21B read the sum value together with the system information, and verify the consistency of the system information based on this sum value.

Figure 5:
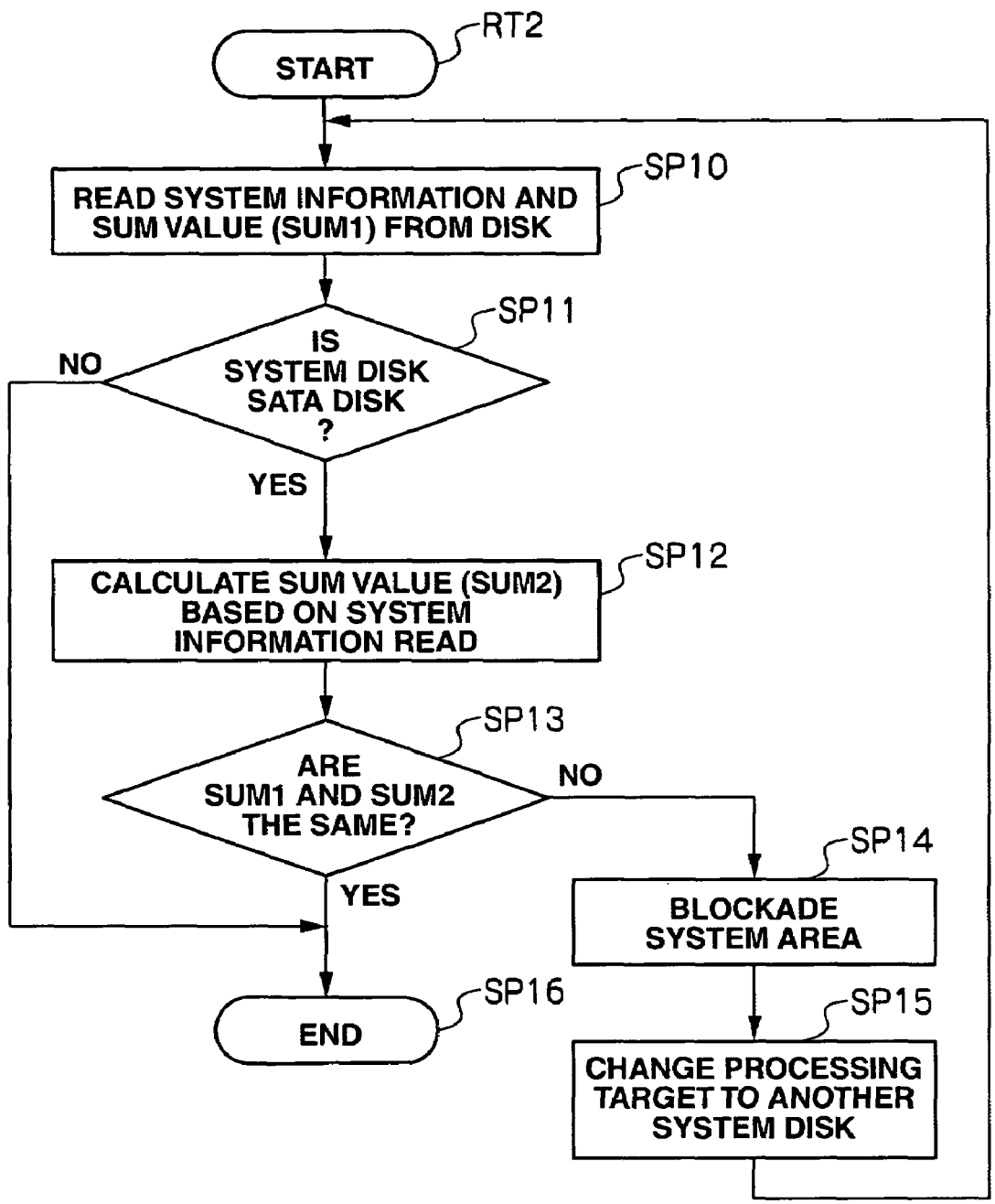
FIG. 5 is a flow chart showing a system information read processing sequence.

In other words, when the system information is read from the system area 31 in the system disk 10, the CPUs 21A and 21B first read the system information and the sum value from the system area of one system disk in accordance with the system information read processing procedure RT2 shown in FIG. 5, and store them in the cache memories 24A and 24B (SP10). Then, the CPUs 21A and 21B judge whether or not the system disk 10A is a SATA disk, based on the system information read out above (SP11). This disk type information may be separated from the system information and retained in advance, so that the CPUs 21A and 21B can refer thereto.

If the result of the above judgment is NO (SP11: NO), the CPUs 21A and 21B judge that the system disk 10A is a Fibre Channel disk and terminate the processing of reading the system information (SP16).

Figure 6:
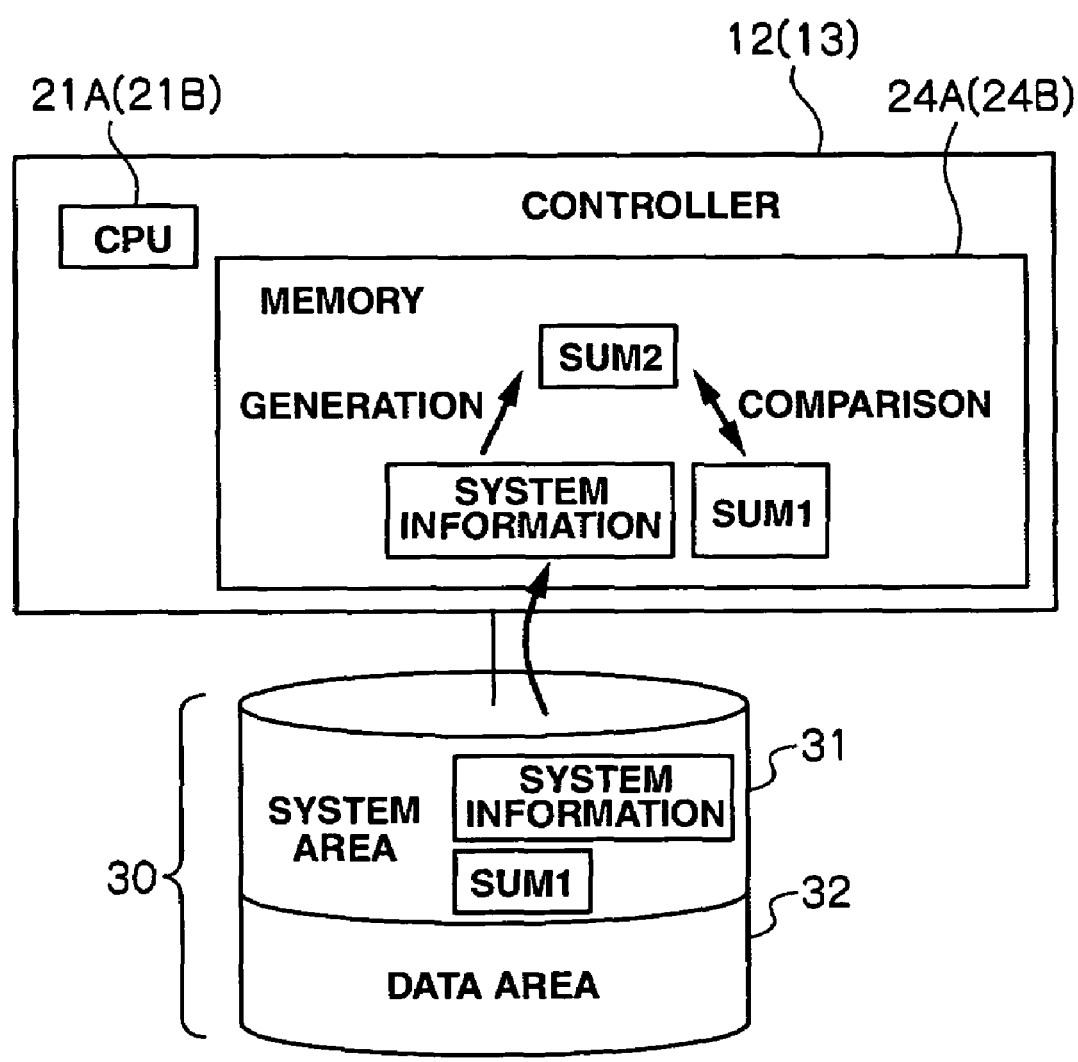
FIG. 6 is a conceptual diagram illustrating processing for reading or writing system information from or to a system area in a disk device.

On the other hand, if the result of the judgment in step SP11 is YES (SP11: YES), the CPUs 21A and 21B calculate a sum value of the system information based on the system information that is read from the system disk 10A and stored in the cache memories 24A and 24B, and store the calculation result in the cache memories 24A and 24B, as shown in FIG. 6 (SP12). Here, the calculation is performed using the same calculation method as that in step SP1 in the above described system information read processing procedure RT1 in FIG. 3. Accordingly, if a read/write error has not occurred in reading/writing the system information from/to the system disk 10A, the sum value then calculated (hereinafter referred to as the "second sum value") is equal to the sum value read from the system disk 10A (hereinafter referred to as the "first sum value").

So the CPUs 21A and 21B compare the first and second sum values and judge whether or not these values are the same (SP13). If the first and second sum values are the same (SP13: YES), the CPUs 21A and 21B terminate the system information read processing (SP16).

If the first and second sum values are not the same (SP13: NO), that is, if the system information is not consistent, the CPUs 21A and 21B execute processing for blockading the system area 31 in the system disk 10A, from which the system information has been read. Specifically, the CPUs 21A and 21B register the blockade of the system disk area 31 to a management table (not shown, hereinafter referred to as the "system area blockade management table") that is included in the system information stored in cache memories 24A and 24B and manages whether or not the system area 31 in the system disk 10A is blockaded.

By thus blockading only the system area 31 in the system disk 10A in which the system information is not consistent, data reading/writing can be continued after that in the data area 32 of the system disk 10A. In this case, for example, if the entire system disk 10A is blockaded, the data stored in the data area of the blockaded system disk 10A is recovered by using redundant data read from another disk device 10 in the RAID group including the blockaded system disk 10A. Therefore, the data read performance deteriorates due to this recovery processing. However, deterioration of data read performance can be efficiently avoided by blockading only the system area 31 in the system disk 10A.

The CPUs 21A and 21B then change the processing target to another system disk 10A (SP15), and execute the same processing on that changed system disk 10A and/or still another system disk 10A (SP10 to SP16). Thus, the system information is read from any one of the system disks 10A, and stored in the cache memories 24A and 24B.

As described above, when the system information is written in the system area 31 in the system disk 10A in this disk array apparatus 4, the sum value of the system information (the first sum value) is calculated and is written together with this system information, and the consistency of the system information is verified based on the sum value when the system information is read from the system disk 10A. In this manner, malfunctions occurring due to the use of a SATA disk as the system disk 10A can be efficiently avoided. Accordingly, an inexpensive disk array apparatus can be constructed while maintaining high reliability.

(1-3) On-Line Verification Processing in the System Area

In addition to the above described the system information consistency check at start-up, verification processing for verifying the consistency of data (system information) stored in the system area 31 in the system disk 10A is regularly performed in this disk array apparatus 4.

Figure 7:
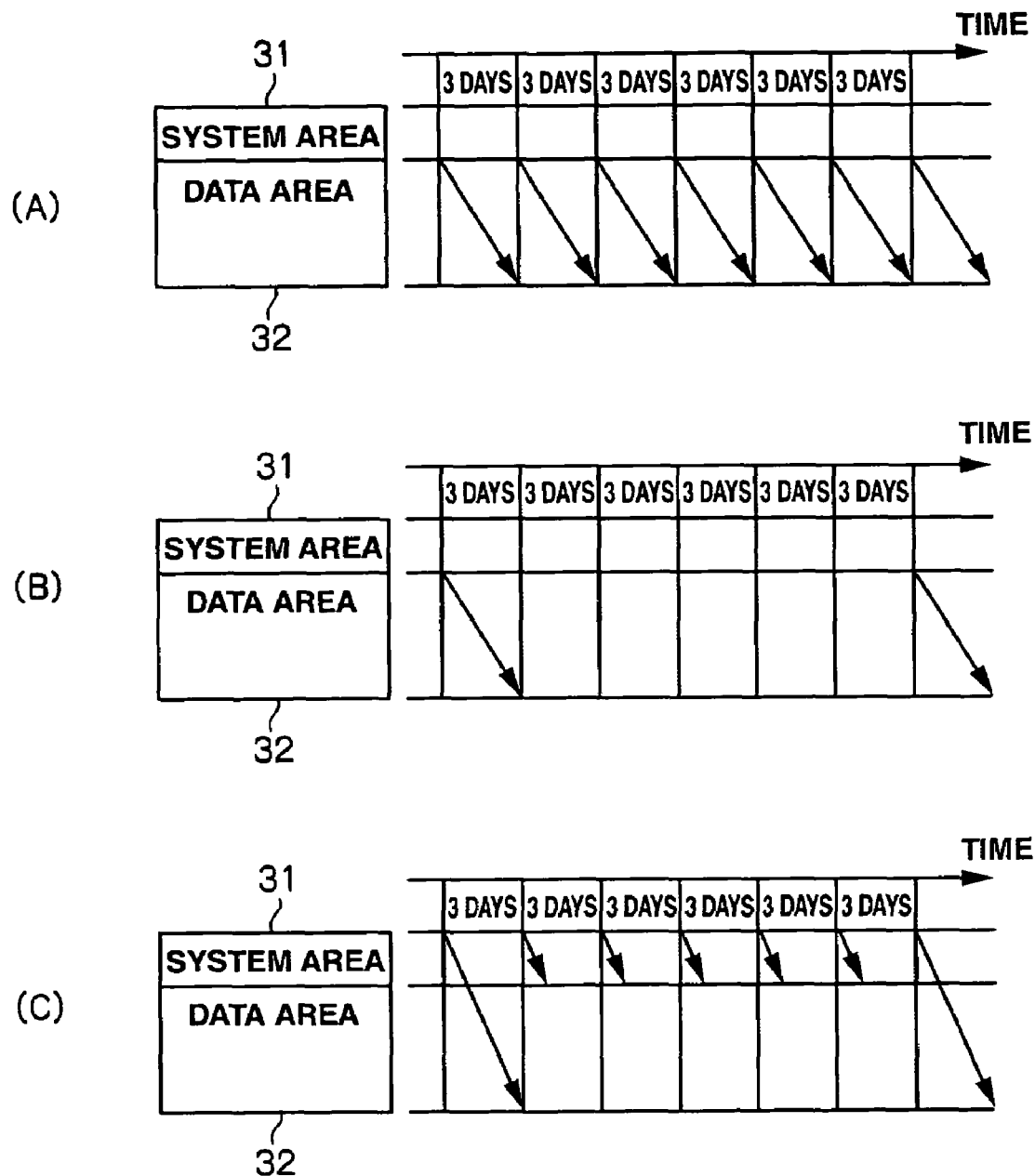
FIGS. 7(A), (B), and (C) are schematic diagrams illustrating on-line verification processing for a disk device.

That is, in this disk array apparatus 4, so-called on-line verification, in which data consistency is verified while the disk array apparatus is being operated, i.e., in an on-line state, is performed on the Fibre Channel disks in a fixed cycle (hereinafter referred to as "three-day cycle") as shown in FIG. 7(A). Verification processing in this case is performed only on the data area 32. Because there is difficulty in constant access to SATA disks with high loads, verification processing on the SATA disks is performed in a cycle six times longer than of that of the Fibre Channel disks, i.e., in a 18-day cycle only on the data area 32, as shown in FIG. 7(B).

Moreover, as for the SATA disks used as the system disks 10A in this disk array apparatus 4, not only the above-mentioned on-line verification processing on the data area 32, but also verification processing on their system areas 31 is performed in a shorter cycle than that of the on-line verification processing on the data area 32, one equivalent to the cycle of the processing on the Fibre Channel disks, namely in a three-day cycle, as shown in FIG. 7(C).

In this case, the system area 31 has a small capacity of 400 MB or less, and so the access time is no more than 20 seconds. Accordingly, even if the verification processing is performed on the system area 31 in the system disk 10A, the system disk 10A will not be highly loaded.

Figure 8:
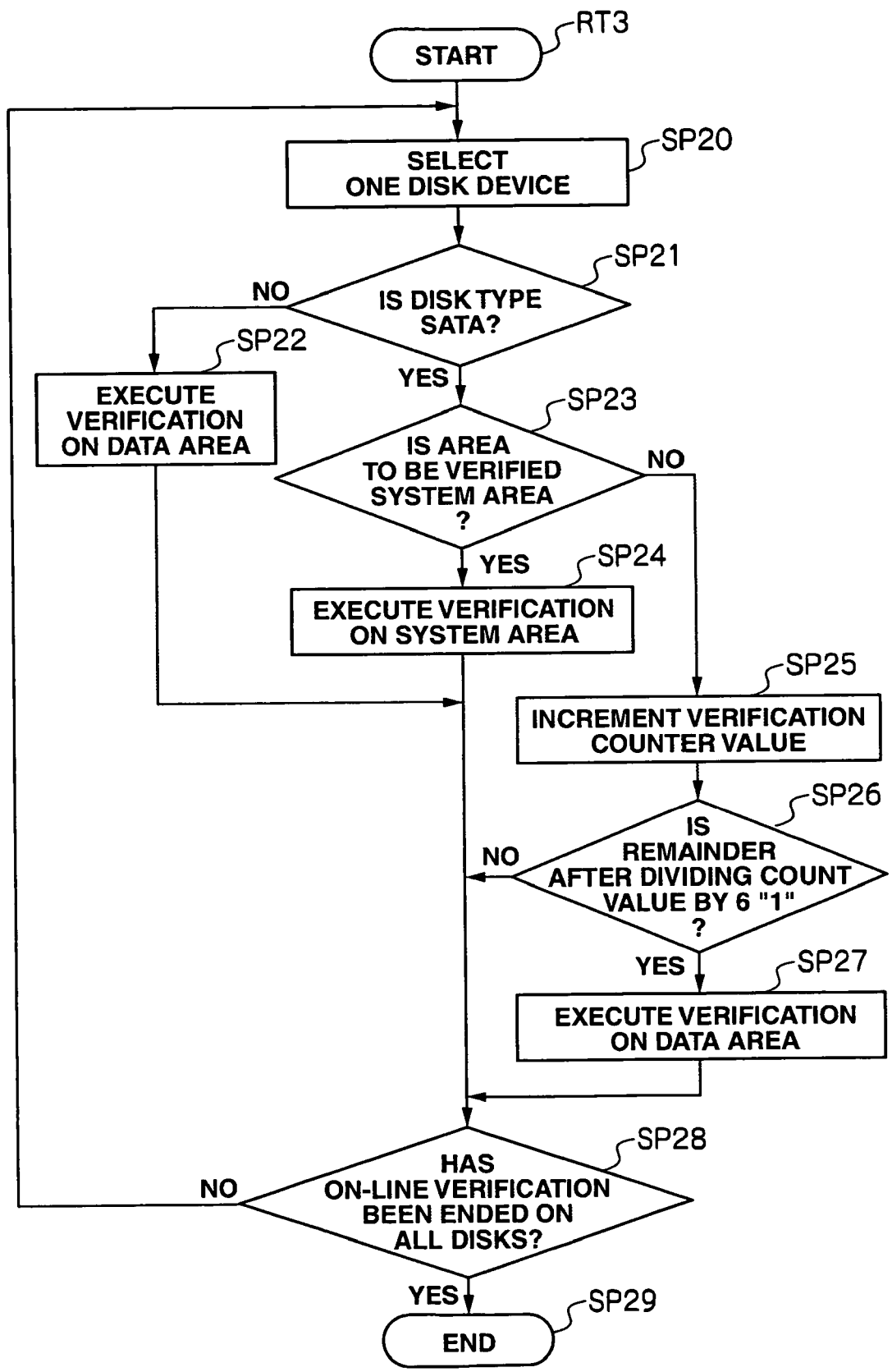
FIG. 8 is a flow chart showing an on-line verification processing sequence.

FIG. 8 is a flowchart showing the processing sequence performed by the CPUs 21A and 21B for the above described on-line verification function. The CPUs 21A and 21B start the on-line verification processing procedure RT3 shown in the flowchart in a regular cycle, and first select one disk device 10A on which the on-line verification processing is to be performed (SP20).

Next, the CPUs 21A and 21B judge whether or not the selected disk device 10A is a SATA disk, based on the system information stored in the cache memories 24A and 24B (SP21). If the result of that judgment is NO (SP21: NO), the CPUs 21A and 21B judge that this disk device 10A is a Fibre Channel disk and execute verification processing on the data area 32 of the disk device 10A (SP22).

When the CPUs 21A and 21B terminate the verification processing, they judge whether or not the verification processing for all the disk devices 10 has been terminated (SP28). If the result of that judgment is NO (SP28: NO), the CPUs 21A and 21B then proceed to the processing for the next disk device 10 (SP20).

If the result of the judgment in step SP21 is YES (SP21: YES), the CPUs 21A and 21B judge whether or not the area to be verified is the system area 31, i.e., whether or not the SATA disk subject to the on-line verification processing is a system disk 10A, based on the system information stored in the cache memories 24A and 24B (SP23).

If the result of the judgment is YES (SP23: YES), the CPUs 21A and 21B execute verification processing on the system area 31 in this SATA disk (SP24), and then judge whether or not the verification processing has been performed on all disk devices 10 (SP28). If the result of that judgment is NO (SP28: NO), the CPUs 21A and 21B proceed to the processing for the next disk device 10 (SP20).

If the result of the judgment in step SP23 is NO (SP23: NO), the CPUs 21A and 21B increment the count value of a corresponding counter (hereinafter referred to as "verification counter") by "1," and judge whether or not the remainder after dividing the count value for this verification counter by 6 is 1 (SP26).

If the result is NO (SP26: NO), it means that this is not the cycle when verification processing on the data area 32 of the SATA disk should be performed. Accordingly, the CPUs 21A and 21B judge whether or not the verification processing for all disk devices 10 has been terminated (SP28). If the result is NO (SP28: NO), the CPUs 21A and 21B proceed to the processing for the next disk device 10 (SP20).

If the result of the judgment in step SP26 is YES (SP26: YES), it means that this is a cycle when on-line verification processing of the data area 32 in the SATA disk should be performed. At this moment, the CPUs 21A and 21B execute verification processing on the data area 31 in this SATA disk (SP27). Then, the CPUs 21A and 21B judge whether or not verification processing for all the disk devices 10 has been terminated (SP28). If the result is NO (SP28: NO), the CPUs 21A and 21B proceed to the processing for the next disk device 10 (SP20).

After that, when the CPUs 21A and 21B complete processing for all the disk devices 10 (SP28), the on-line verification processing is terminated (SP29).

Figure 9:
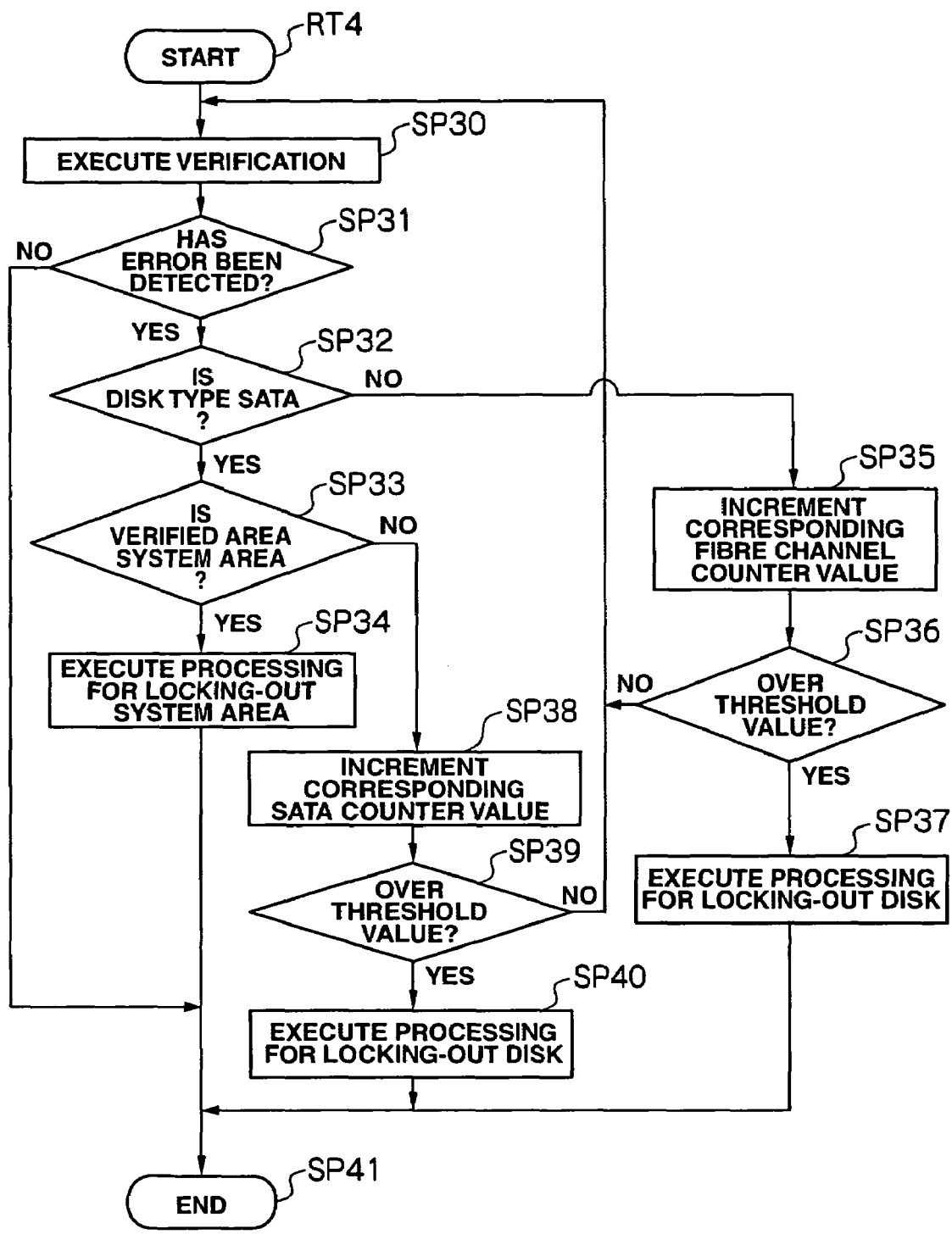
FIG. 9 is a flow chart showing an on-line verification execution processing sequence.

FIG. 9 is a flowchart showing the specific content of the verification processing performed in steps SP22, SP24, and SP27 of the above described on-line verification processing procedure RT3.

Namely, when the CPUs 21A and 21B proceed to step SP22, SP24, or SP27 in the on-line verification processing procedure RT3, they start the on-line verification execution processing procedure RT4 shown in the flowchart in FIG. 9. First, the CPUs 21A and 21B execute the verification processing on the system area 31 or the data area 32 of the disk device 10 (SP30).

When the verification processing is terminated, the CPUs 21A and 21B judge whether or not any error has been detected in this verification processing (SP31). If the result is NO (SP31: NO), the CPUs 21A and 21B terminate this on-line verification processing (SP41) and proceed to step SP28 in the on-line verification processing procedure RT3.

If the result is YES (SP31: YES), the CPUs 21A and 21B judge whether or not the disk device 10 that was is the target of the verification processing then performed is a SATA disk (SP32).

If the result is YES (SP32: YES), the CPUs 21A and 21B judge whether or not the area of the disk device 10 on which the verification processing was performed is the system area 31 (SP33).

If the result is YES (SP33: YES), the CPUs 21A and 21B execute the processing for blockading the system area 31 in this disk device 10 in the same manner as in the above described step SP14 of the system information read processing procedure RT1 in FIG. 5 (SP34). Subsequently, the CPUs 21A and 21B terminate this on-line verification execution processing (SP41) and proceed to step SP28 of the on-line verification processing procedure RT3.

On the other hand, if the result is NO in step SP32 because the disk device 10 that was the target of the on-line verification processing then performed is not a SATA disk (or the disk device 10 is a Fibre Channel disk) (SP32: NO), the CPUs 21A and 21B increment the value of a corresponding counter (hereinafter referred to as "FC verification counter") by "1" (SP35), and then judge whether or not the value of the FC verification counter exceeds a predetermined threshold value (SP36).

If the result is NO (SP36: NO), the CPUs 21A and 21B execute the processing in step SP30 and subsequent steps again on the same area (the data area 32) of the disk device 10. Accordingly, if the error found in step SP31 is not a time-out error or the like but an error caused by an irrecoverable constant disk defect occurring in the disk device 10, the result of the judgment in step SP36 becomes YES at some point in time (SP36: YES).

Then, the CPUs 21A and 21B execute processing for blockading the entire disk device 10 (SP37), terminate this on-line verification processing (SP41), and then proceed to step SP28 of the on-line verification processing procedure RT3.

The processing for blockading the disk device 10 includes interruption of the power source of the disk device 10 and changing the operation state of the disk device 10 from "operating" to "stopped state" in a table for managing the state of the disk device 10 included in the system information.

Meanwhile, if the result in step SP33 is NO because the disk device 10 that was the target of the on-line verification processing then performed is a SATA disk and the area on which the verification processing has been performed is not the system area 31 (SP33: NO), the CPUs 21A and 21B increment the value of the corresponding counter (hereinafter referred to as "SATA verification counter") by "1" (SP38), and then judge whether or not the value of the SATA verification counter exceeds a predetermined threshold value (SP39).

If the result of that judgment is NO (SP39: NO), the CPUs 21A and 21B execute the processing in step SP30 and subsequent steps again on the same area (the data area 32) of this disk device 10. Accordingly, if the disk device 10 has an irrecoverable defect, the result of the judgment in step SP39 becomes YES at some point in time (SP39: YES). Then, the CPUs 21A and 21B execute processing for blockading the entire disk device 10 (SP40), terminate the on-line verification processing (SP41), and proceed to step SP28 of the on-line verification processing procedure RT3.

As described above, in this disk array apparatus 4, not only the system information consistency check at start-up, but also the regular verification processing on the system area 31 in the system disk 10A is performed. Therefore, the reliability of the system information can be further improved even when a SATA disk is used as a system disk 10A, and thereby a disk array apparatus can be constructed inexpensively while maintaining reliability.

(1-4) System Area Recovery Processing

Not only one system disk 10A, but a plurality of (for example, five) system disks 10A are used for redundancy purposes. However, if the system area 31 is blockaded as described above, there is no mechanism to automatically recover the blockaded system area at present. The recovery processing automatically performed after the blockaded system disk 10A is replaced and a user's instructions manually input is the only recovery means.

Figure 10:
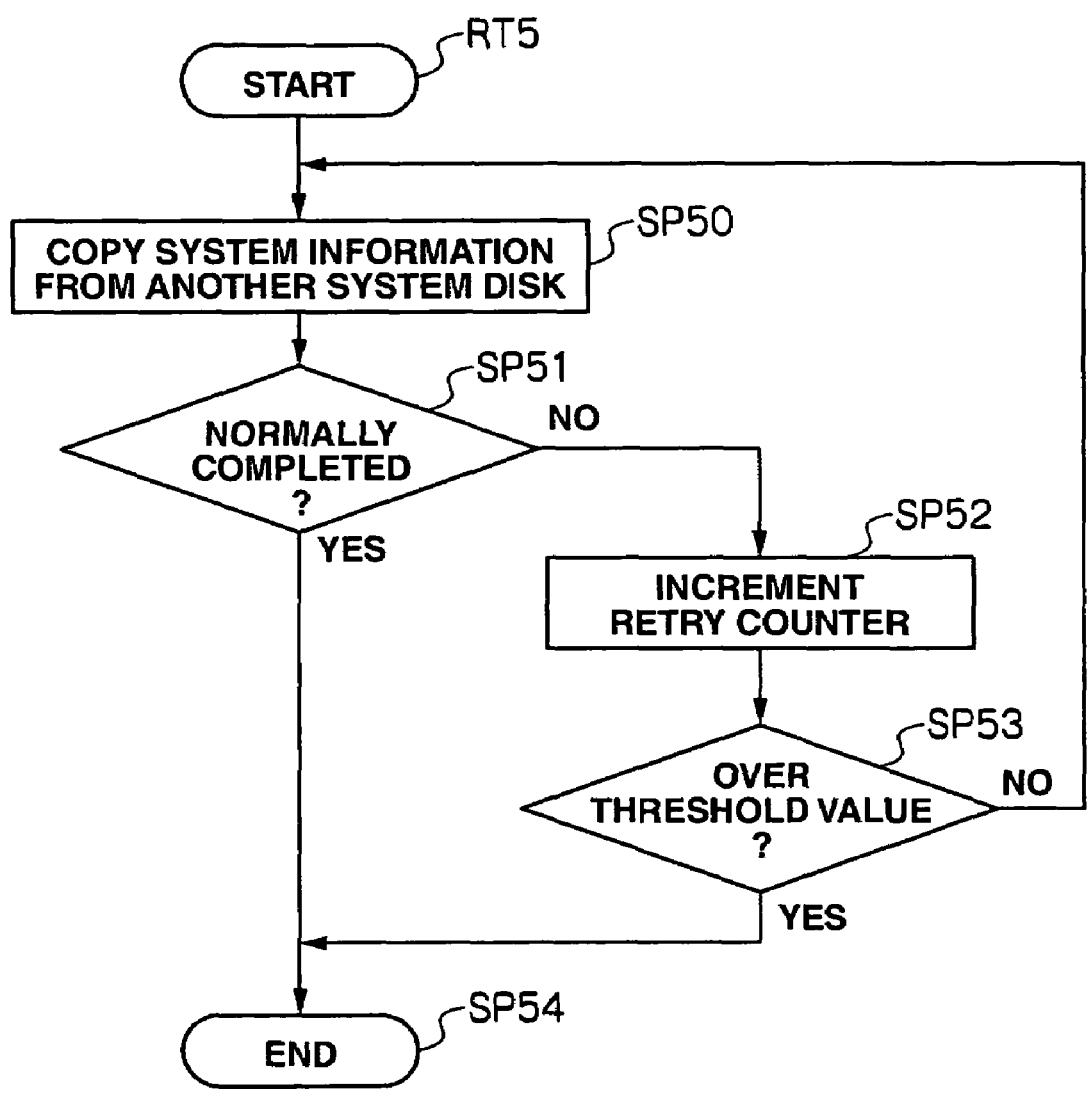
FIG. 10 is a flow chart showing a system area recovery processing sequence.

Therefore, in this disk array apparatus 4, when the system area 31 in the system disk 10A is blockaded in step SP14 of the system information read processing procedure RT2 in FIG. 5 and in step SP34 of the on-line verification execution processing procedure RT4 in FIG. 9, the system area recovery processing procedure RT5 shown in FIG. 10 is executed in parallel with the above system information read processing procedure RT2 and the on-line verification execution processing procedure RT4. In this manner, the system area 31 of the system disk 10A is immediately recovered.

Namely, when the system area 31 in the system disk 10A is blockaded in step SP14 of the system information read processing procedure RT2 (FIG. 5) and in step 34 of the on-line verification execution processing procedure RT4 (FIG. 9), the CPUs 21A and 21B start the system area recovery processing procedure RT5.

The CPUs 21A and 21B first search other system disks 10A based on the system information stored in the cache memories 24A and 24B, read the system information from the system area 32 of the searched system disks 10A, and copy the system information to the blockaded system area 32 of the system disk 10A (SP50).

Subsequently, the CPUs 21A and 21B judge whether or not the copy has been completed normally (SP51). If the copy has been completed normally (SP51: YES), the system area recovery processing is terminated (SP54).

Meanwhile, if the result of the judgment in step SP51 is NO (SP51: NO), the CPUs 21A and 21B increment the counted value (initially "0") of the number of retries for the system area recovery processing (SP52). Then, the CPUs 21A and 21B judge whether or not the counted value exceeds a predetermined threshold value (SP53).

If the result is NO (SP53: NO), the CPUs 21A and 21B return to step SP50 and execute the same processing again. Accordingly, if the system device 10A has an irrecoverable defect, the result of the judgment in step 53 become YES at some point in time (SP53: YES). Then, the CPUs 21A and 21B terminate the system area recovery processing (SP54). Accordingly, the system area 31 in this system disk 10A is left in the blockaded state.

Therefore, in this disk array apparatus 4 whether or not there is any blockaded system area 31 in the system disk 10A is checked regularly (for example, once a day). If any of the system disks 10A is found to include a blockaded system area 31, recovery processing is again performed.

Figure 11:
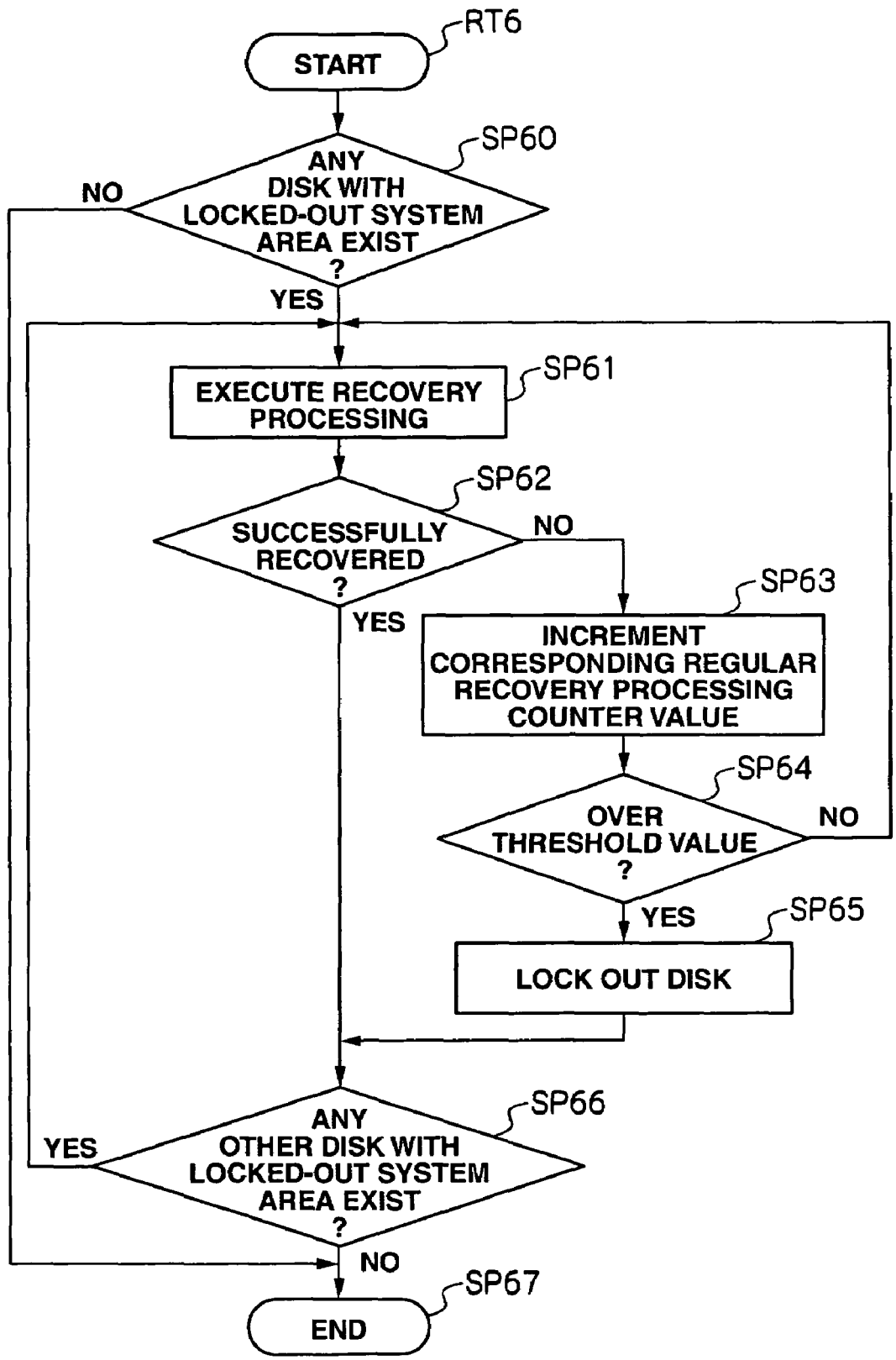
FIG. 11 is a flow chart showing a system area regular recovery processing sequence.

FIG. 11 is a flowchart showing the content of the regular recovery processing for the system area 31 in the system disk 10A. The CPUs 21A and 21B execute the regular recovery processing for the system area 31 in accordance with the system area regular recovery processing procedure RT6 shown in this flowchart.

Namely, at the predetermined time to execute the recovery processing on the system area 31, the CPUs 21A and 21B start the system area regular recovery processing procedure RT6. First, the CPUs 21A and 21B judge whether or not there is any system disk 10A having a blockaded system area 31 (SP60).

If the result of that judgment is NO (SP60: NO), the CPUs 21A and 21B terminate the system area regular recovery processing (SP67). Meanwhile, if the result of the judgment in step SP60 is YES (SP60: YES), the CPUs 21A and 21B execute recovery processing for the system device 10A having the blockaded system area 31 by copying the system information stored in the system area 31A of the normal system disk 10A to the system area 31, in the same manner as in step SP50 of the above described system area recovery processing procedure RT5 shown in FIG. 10 (SP61).

Subsequently, the CPUs 21A and 21B judge whether or not the recovery processing for the system disk 10A has succeeded, that is, whether or not copying has been completed (SP62) normally. If the result is YES (SP62: YES), then the CPUs 21A and 21B judge whether or not any other system disk 10A includes a blockaded system area 31 (SP66).

If the result is YES (SP66: YES), the CPUs 21A and 21B return to step SP61 and execute the same recovery processing as described above for that system disk 10A.

If the result of the judgment in step SP62 is NO (SP62: NO), the CPUs 21A and 21B increment the value of the regular recovery processing counter corresponding to this system disk 10A by "1" (SP63), and then judge whether or not the value of the regular recovery processing counter exceeds a predetermined threshold value (SP64).

If the result is NO (SP64: NO), the CPUs 21A and 21B return to step SP61 and execute again the same processing as described above. Accordingly, when the system disk 10A has an irrecoverable defect, the loop of steps SP61 to 64 and back to SP61 is repeated, and the result of the judgment in step SP64 becomes "YES" at some point in time (SP64: YES).

Then, the CPUs 21A and 21B execute processing for blockading the entire disk device 10 (SP65), and judge whether or not there is another system disk 10A having a blockaded system area 31 (SP66).

When no system disk 10A has a blockaded system area (SP66: YES), the CPUs 21A and 21B terminate the system area regular recovery processing (SP67).

In this manner, when the system area 31 in the system disk 10A is blockaded in this disk array apparatus 4, the recovery processing is repeatedly performed on this system area 31 twice or three times, whereby the redundancy of the system is maintained and deterioration of reliability is effectively avoided.

(2) Another Embodiment

The aforementioned embodiment describes the case in which the invention is applied to the disk array apparatus 4 having dual controllers constructed as shown in FIG. 1. However, the invention is not limited to this embodiment and is widely applicable to disk array apparatuses 4 of other various configurations.

The aforementioned embodiment also describes the case in which the disk device 10 is used as a storage device for storing system information and data given from the host computer 2. However, the invention is not limited to this embodiment and other various storage devices can be used.

Moreover, the aforementioned embodiment describes the case in which a SATA disk is used as a system disk 10A. However, the invention is not limited to this embodiment. Other various disks such as ATA disks or optical disks can be used. Even when a highly reliable disk device such as a Fibre Channel disk is used as the system disk 10A, reliability of the disk array apparatus can be further improved by applying the present invention to the apparatus.

Furthermore, the aforementioned embodiment describes the case in which the sum value is used as verification information for verifying system information consistency when the system information is written to the system disk 10A. However, the present invention is not limited to this embodiment. For example, a data guaranty code such as an ECC (Error Correction Code) or an LRC (Longitudinal Redundancy Check) may be used as verification information, or both the sum value and the data guaranty code may be used. Other various types of information can also be used as the verification information.

Moreover, the aforementioned embodiment describes the case where one sum value is generated for one unit of system information. However, the present invention is not limited to this embodiment. For example, verification information such as the sum value may be generated for each of the system information elements such as a microprogram, configuration information, and trace information, and the thus generated verification information may be stored in the system area 31 in the system disk 10A in order to verify the consistency of the system information elements based on the verification information for each of those system information elements.

The present invention is applicable not only to a disk array apparatus using a disk with low reliability as a system disk, but also to various disk array apparatus configurations.

We claim:

1. A disk array apparatus operating based on predetermined system information, the disk array apparatus comprising:
   a storage device for storing the system information; and
   a management unit for managing a storage area in the storage device by dividing the storage area into a system area for storing the system information and a data area for storing data from a host system,
   wherein the management unit executes verification processing on the data area in the storage device in a first cycle, and executes verification processing on the system area in a second cycle that is shorter than the first cycle.

2. The disk array apparatus according to claim 1, wherein the storage device for storing the system information is a SATA (Serial AT Attachment) disk.

3. The disk array apparatus according to claim 1, wherein the management unit blockades only the system area in the storage device when an error is detected by the verification processing performed on the system area in the storage device.

4. The disk array apparatus according to claim 3, wherein when the management unit blockades the system area in the storage device, the management unit immediately executes predetermined first recovery processing for recovering the system area.

5. The disk array apparatus according to claim 4, wherein the management unit regularly executes predetermined second recovery processing for recovering the blockaded system area in the storage device, in addition to the first recovery processing.

6. The disk array apparatus according to claim 5, wherein the management unit blockades the entire storage device in which an error that cannot be recovered by the regular recovery processing has occurred.

7. The disk array apparatus according to claim 1, wherein the management unit generates, based on the system information, verification information for verifying consistency of the system information, stores the verification information together with the system information in the system area in the storage device, and verifies the consistency of the system information based on the verification information when reading the system information from the system area in the storage device.

8. The disk array apparatus according to claim 7, comprising a plurality of storage devices for storing the system information,
   wherein when the system information read from the storage device is not consistent in the verification, the system information is read from another storage device.

9. The disk array apparatus according to claim 8, wherein when the system information read from the storage device is not consistent in the verification, the system area of that storage device is blockaded.

10. A method for controlling a disk array apparatus operating based on predetermined system information, comprising:
    a first step of managing a storage area in a storage device for storing the system information by dividing the storage area into a system area for storing the system information and a data area for storing data from a host system; and a second step of executing verification processing on the data area in the storage device in a first cycle, and executing verification processing on the system area in a second cycle that is shorter than the first cycle.

11. The disk array apparatus control method according to claim 10, wherein the storage device for storing the system information is a SATA (Serial AT Attachment) disk.

12. The disk array apparatus control method according to claim 10, wherein, in the second step, when an error is detected by the verification processing on the system area in the storage device, only the system area of that storage device is blockaded.

13. The disk array apparatus control method according to claim 12, wherein, in the second step, when the system area in the storage device is blockaded, predetermined first recovery processing for recovering the system area is immediately executed.

14. The disk array apparatus control method according to claim 13, wherein, in the second step, predetermined second recovery processing for recovering the blockaded system area in the storage device is regularly executed in addition to the first recovery processing.

15. The disk array apparatus control method according to claim 14, wherein, in the second step, the entire storage device in which an error that cannot be recovered by the regular recovery processing has occurred is blockaded.

16. The disk array apparatus control method according to claim 10, wherein, in the second step, verification information for verifying consistency of the system information is generated based on the system information, the verification information is stored together with the system information in the system area in the storage device, and the system information consistency is verified based on the verification information when the system information is read from the system area in the storage device.

17. The disk array apparatus control method according to claim 16, wherein the disk array apparatus has a plurality of storage devices for storing system information, and when in the second step the system information read from the storage device is not consistent in the verification, the system information is read from another storage device.

18. The disk array apparatus control method according to claim 17, wherein when in the second step the system information read from the storage device is not consistent in the verification, the system area of that storage device is blockaded.

* * * * *